United States Patent
Thielen et al.

(10) Patent No.: US 10,979,758 B2
(45) Date of Patent: *Apr. 13, 2021

(54) DYNAMIC CONTROL OF FINGERPRINTING RATE TO FACILITATE TIME-ACCURATE REVISION OF MEDIA CONTENT

(71) Applicant: Gracenote, Inc., Emeryville, CA (US)

(72) Inventors: Kurt R. Thielen, Maple Grove, MN (US); Shashank C. Merchant, Sunnyvale, CA (US); Peter Dunker, Thuringia (DE); Markus K. Cremer, Orinda, CA (US); Steven D. Scherf, Oakland, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,652

(22) Filed: Nov. 5, 2019

(65) Prior Publication Data

US 2020/0068248 A1    Feb. 27, 2020

Related U.S. Application Data

(63) Continuation of application No. 16/166,561, filed on Oct. 22, 2018, now Pat. No. 10,506,275.

(Continued)

(51) Int. Cl.
*H04N 7/10* (2006.01)
*H04N 7/025* (2006.01)
(Continued)

(52) U.S. Cl.
CPC ... *H04N 21/4305* (2013.01); *H04N 21/23424* (2013.01); *H04N 21/440281* (2013.01); *H04N 21/4307* (2013.01); *H04N 21/44016* (2013.01)

(58) Field of Classification Search
None
See application file for complete search history.

(56) References Cited

U.S. PATENT DOCUMENTS

| 7,627,808 B2 | 12/2009 | Blank et al. |
| 8,230,343 B2 | 7/2012 | Logan et al. |
| (Continued) | | |

FOREIGN PATENT DOCUMENTS

| KR | 20180028588 | 3/2018 |
| WO | WO 2016200622 | 12/2016 |

OTHER PUBLICATIONS

International Search Report and Written Opinion from International Application No. PCT/US2019/035955, dated Sep. 24, 2019.

(Continued)

*Primary Examiner* — William J Kim
(74) *Attorney, Agent, or Firm* — McDonnell Boehnen Hulbert & Berghoff LLP (57) ABSTRACT

A computing system identifies a media stream being received by a client, based on fingerprint matching conducted with query fingerprints generated by the client at a frame rate. The computing system then causes the client to increase the frame rate, in order to facilitate establishment by the computing system of synchronous lock between true time within the media stream and client time according to an clock of the client. The computing system then uses the established synchronous lock as a basis to map a true-time point at which a content revision should be performed in the media stream to a client-time point at which the client should perform the content revision. And the computing system causes the client to perform the content revision at the determined client-time point.

20 Claims, 4 Drawing Sheets

Related U.S. Application Data (60) Provisional application No. 62/698,629, filed on Jul. 16, 2018.

(51) Int. Cl.
 *H04N 21/43* (2011.01)
 *H04N 21/234* (2011.01)
 *H04N 21/4402* (2011.01)
 *H04N 21/44* (2011.01)

(56) References Cited

U.S. PATENT DOCUMENTS

| | | |
|---|---|---|
| 8,249,992 B2 | 8/2012 | Harkness et al. |
| 8,863,165 B2 | 10/2014 | Gordon |
| 9,015,741 B2 | 4/2015 | Gordon |
| 9,299,364 B1 | 3/2016 | Pereira et al. |
| 9,313,359 B1 | 4/2016 | Stojancic et al. |
| 9,319,740 B2 | 4/2016 | Sinha et al. |
| 9,386,356 B2 | 7/2016 | Harrison |
| 9,510,044 B1 | 11/2016 | Pereira et al. |
| 9,798,513 B1 | 10/2017 | Pereira et al. |
| 2004/0237102 A1 | 11/2004 | Konig et al. |
| 2005/0149968 A1 | 7/2005 | Konig et al. |
| 2005/0172312 A1 | 8/2005 | Lienhart et al. |
| 2005/0177847 A1 | 8/2005 | Konig et al. |
| 2007/0192863 A1 | 8/2007 | Kapoor et al. |
| 2008/0249961 A1 | 10/2008 | Harkness et al. |
| 2008/0274687 A1 | 11/2008 | Roberts et al. |
| 2009/0077220 A1 | 3/2009 | Svendsen et al. |
| 2009/0167942 A1 | 7/2009 | Hoogenstraaten et al. |
| 2009/0254392 A1 | 10/2009 | Zander |
| 2010/0225810 A1 | 9/2010 | Berkvens et al. |
| 2010/0265390 A1 | 10/2010 | Zhang |
| 2011/0213869 A1 | 9/2011 | Korsunsky et al. |
| 2011/0289098 A1 | 11/2011 | Oztaskent et al. |
| 2012/0117584 A1 | 5/2012 | Gordon |
| 2013/0247085 A1 | 9/2013 | Lee et al. |
| 2013/0276033 A1 | 10/2013 | Francini et al. |
| 2013/0302011 A1 | 11/2013 | Nagorski et al. |
| 2014/0106708 A1 | 4/2014 | Samari et al. |
| 2014/0115627 A1 | 4/2014 | Lee et al. |
| 2015/0020094 A1 | 1/2015 | Moon et al. |
| 2016/0073141 A1 | 3/2016 | Brand et al. |
| 2016/0110537 A1 | 4/2016 | Harrison |
| 2016/0212495 A1 | 7/2016 | Chang et al. |
| 2016/0267180 A1 | 9/2016 | Harron et al. |
| 2017/0026718 A1 | 1/2017 | Yabu |
| 2017/0085946 A1 | 3/2017 | Pira |
| 2018/0007431 A1 | 1/2018 | Sidhu et al. |
| 2018/0035149 A1 | 2/2018 | Choi et al. |
| 2018/0060667 A1 | 3/2018 | Diggins |
| 2018/0091873 A1 | 3/2018 | Navin et al. |
| 2019/0018846 A1 | 1/2019 | Yeo et al. |

OTHER PUBLICATIONS

International Search Report and Written Opinion from International Application No. PCT/US2019/035961, dated Oct. 1, 2019.
Office Action from U.S. Appl. No. 16/166,948, dated Sep. 5, 2019.
Notice of Allowance from U.S. Appl. No. 16/166,948, dated Nov. 25, 2019.

DYNAMIC CONTROL OF FINGERPRINTING RATE TO FACILITATE TIME-ACCURATE REVISION OF MEDIA CONTENT

REFERENCE TO RELATED APPLICATIONS

This application is a continuation of U.S. patent application Ser. No. 16/166,561, filed Oct. 22, 2018, which claims priority to U.S. Provisional Patent Application No. 62/698,629, filed Jul. 16, 2018, the entirety of each of which is hereby incorporated by reference.

This application is also related to U.S. patent application Ser. No. 16/166,948, filed Oct. 22, 2019, the entirety of which is hereby incorporated

BACKGROUND

A typical media client operates to receive an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, mobile communication devices, gaming consoles, streaming media players, and the like.

By way of example, a television could receive a broadcast stream (e.g., over the air, from a set top box, through an Internet connection, or in another manner) and could present the media content of that broadcast stream to a user. As another example, a set top box could receive a broadcast stream from a multi-channel video program distributor and could output the media content of that stream via a High-Definition Multimedia Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

When a media client is receiving a media stream, it may be useful in certain situations for the client to revise a portion of the stream's media content. For example, it may be useful for the client to dynamically replace an ad or other segment of the media content with a replacement ad or with other replacement content, so that when the content is played out to a user, the user would receive the replacement ad in place of the originally included ad. As another example, it may be useful for the client to dynamically supplement a portion of the media content with overlay or split-screen content, such as channel identification, context information, ad content, or the like, so that when the content is being played out to a user, the user would receive the supplemental content together with the originally included content.

Further, it may be desirable for the client to perform such content revision at a specific time point within the media stream. For instance, if the client is to dynamically replace an existing ad with a replacement ad, it may be desirable for the client to position the replacement ad at a time in the media stream when the existing ad would have started. Likewise, if the client is to supplement a specific portion of the media content with an overlay related to that portion, it may be desirable for the client to start the overlay when that portion starts. Other examples are possible as well.

More particularly, the media stream at issue could define a sequence of frames, such as video frames and/or audio frames, and it may be desirable for the client to perform the content revision on a frame-accurate basis. For instance, for ad replacement, it may be desirable for the client to insert the replacement ad in place of the existing ad starting precisely at the first frame of the existing ad. And for adding an overlay to a specific portion of the media stream, it may be desirable for the client to start the overlay at or in specific relation to the first frame of that portion of the media stream.

To facilitate having the client perform this content revision, the client may need to learn the specific time point where the revision is to occur. In practice, however, the revision time point may be defined on a timeline that is unknown to the client. For instance, the revision time point may be defined on a reference timeline within the media stream itself, but the client may not have context for that timeline. Therefore, providing the client with that revision time point may not enable the client to perform the revision at the desired time point in the media stream.

As an non-limiting example of this, consider a media stream that defines an ad pod that could appear within a television broadcast. An ad pod comprises a sequence of ads, such as television commercials. With this example, the client might be a television that is receiving and presenting a linear broadcast feed of a particular television channel, and the ad pod might appear at any moment within that feed. Especially with a live broadcast such as a sporting event, for instance, the time when the ad pod appears in such a feed may be unpredictable. Alternatively, the ad pod could appear at a specifically scheduled time.

In this example, the desired revision could be replacement of a particular ad within the ad pod (e.g. substituting for the ad a different ad or other replacement content). For instance, if the ad pod is a sequence of ads A1, A2, A3, A4, the desired revision could be replacement of ad A3.

In this situation, the ad pod may define an internal timeline, starting at time T=0 and continuing to the end of the ad pod, and ad A3 may begin at time $T_{A3}$ on that timeline. However, the client may lack context for that timeline. The client may have its own internal clock that has a timeline (e.g., time of day or other internal time reference) defining "client time." But without advanced knowledge of where the ad-pod timeline exists within client time, merely given the value $T_{A3}$ as the desired content-revision time point would not enable the client to perform the ad replacement when desired.

One way to address this issue is to perform fingerprint matching, comparing timestamped query fingerprints of the media stream being received by the client with timestamped reference fingerprints of the known media stream such as the known ad pod sequence.

For instance, the client could generate query fingerprints of frames of the media stream that the client is receiving and could timestamp those query fingerprints based on the client's internal clock, and a computing system could receive those timestamped query fingerprints for analysis. Further, the computing system could be provisioned with reference fingerprints of frames of the known media stream such as the known ad pod sequence, timestamped based on reference time or "true time" defined along a timeline within the known media stream. The computing system could thus compare the timestamped query fingerprints with the timestamped reference fingerprints and, upon finding a fingerprint match, could conclude that the timestamp of the matching query fingerprint corresponds with the timestamp of the matching reference fingerprint.

Establishing this correlation between the timestamps of the matching query and reference fingerprints could constitute establishing "synchronous lock" or time mapping between client time and true time. For instance, a difference between the timestamp of the matching query fingerprint and the matching reference fingerprint could define a time offset between true time within the known media stream and client time as the client receives the media stream. Given knowledge of a true-time point of a frame within the known media stream, the computing system could thus use the established synchronous lock to determine the associated client-time point of the same frame in the media stream being received by the client. For instance, the computing system could apply the time offset between true time and client time, in order to determine the client-time point corresponding with the given true-time point.

Continuing with the ad-pod example above, the computing system could thus use the established synchronous lock to map the true-time value $T_{A3}$ to a client-time value denoting the client-time point when the client should replace ad A3 in the media stream being received by the client (e.g. the client-time point where the client should start the ad replacement). And the client could then perform the replacement of ad A3 at that determined client-time point.

A technological problem that can occur with this process, however, is that the client may not generate query fingerprints fast enough to facilitate high-confidence fingerprint matching between the query fingerprints and the reference fingerprints. In particular, to help conserve limited processing power, memory, and/or other resources at the client, the client may be arranged to generate fingerprints at a relatively low frame rate, which may be far below the frame rate of the media stream that the client is receiving. As a result, the detected fingerprint matching may be inaccurate, the established synchronous lock may be inaccurate, and the client may end up performing the desired content revision at the wrong point in the media stream, possibly too early or too late.

For example, with video having 30 frames per second, the client might be set to generate query fingerprints at a low frame rate such as 2 frame per second. But performing fingerprint matching at that low rate, however, may result in a low-confidence fingerprint matching. One reason for this is that the media stream may include various sub-sequences of identical or nearly identical frames, corresponding with portions of the media sequence where the media content does not change at all over a period of time. As a result, some of the query fingerprints generated at the low rate might match multiple reference fingerprints, giving rise to a low-confidence match.

Disclosed is a mechanism to help address this technological problem.

In accordance with the disclosure, a client will normally establish query fingerprints at a relatively low rate (e.g., 2 frames per second in the example above), and a computing system will use those low-rate query fingerprints as a basis for comparison with reference fingerprints of a known media stream, so as to initially determine that media stream being received by the client is the known media stream, i.e., to identify the media stream being received by the client.

Upon thereby determining that the client is receiving the known media stream, the computing system will then cause the client to increase its query-fingerprint generation rate, namely to switch from generating query fingerprints at the relatively low rate to generating query fingerprints at a relatively high rate (e.g., 16 or 30 frames per second in the example above). And the computing system will then use the high-rate query fingerprints as a basis for comparison with reference fingerprints of the known media stream in order to establish synchronous lock with a relatively high degree of confidence. The computing system will then use the established synchronous lock as a basis to cause the client to perform a content revision at a particular point in the media stream being received by the client.

In a representative implementation, the computing system may receive query fingerprints representing a media stream being received by a client, where the query fingerprints are generated by the client at a first frame rate ("low-rate query fingerprints"). As the computing system receives the low-rate query fingerprints generated by the client, the computing system will compare the low-rate query fingerprints with reference fingerprints representing a known media stream. And based on that comparison, the computing system will detect one or more first matches, indicating that the media stream being received by the client is the known media stream.

Responsive to detecting the one or more matches, the computing system will then cause the client to transition from generating the query fingerprints at the first frame rate to generating the query fingerprints at a second frame rate higher than the first frame rate ("high-rate query fingerprints"), and the computing system will receive the high-rate query fingerprints generated by the client, with each high-rate query fingerprint having a respective query-fingerprint timestamp according to a clock of the client.

As the computing system receives the high-rate query fingerprints generated by the client, the computing system will then further compare the high-rate query fingerprints with the reference fingerprints representing the known media stream. And based on this further comparison, the computing system will detect one or more second matches, each second match having an associated one of the query-fingerprint timestamps.

The computing system will then determine, based on the query-fingerprint timestamp associated with each second match, a time when the client should perform a content revision in the media stream being received by the client, time being defined according to the internal clock of the client. And the computing system will cause the client to perform the content revision at the determined time.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
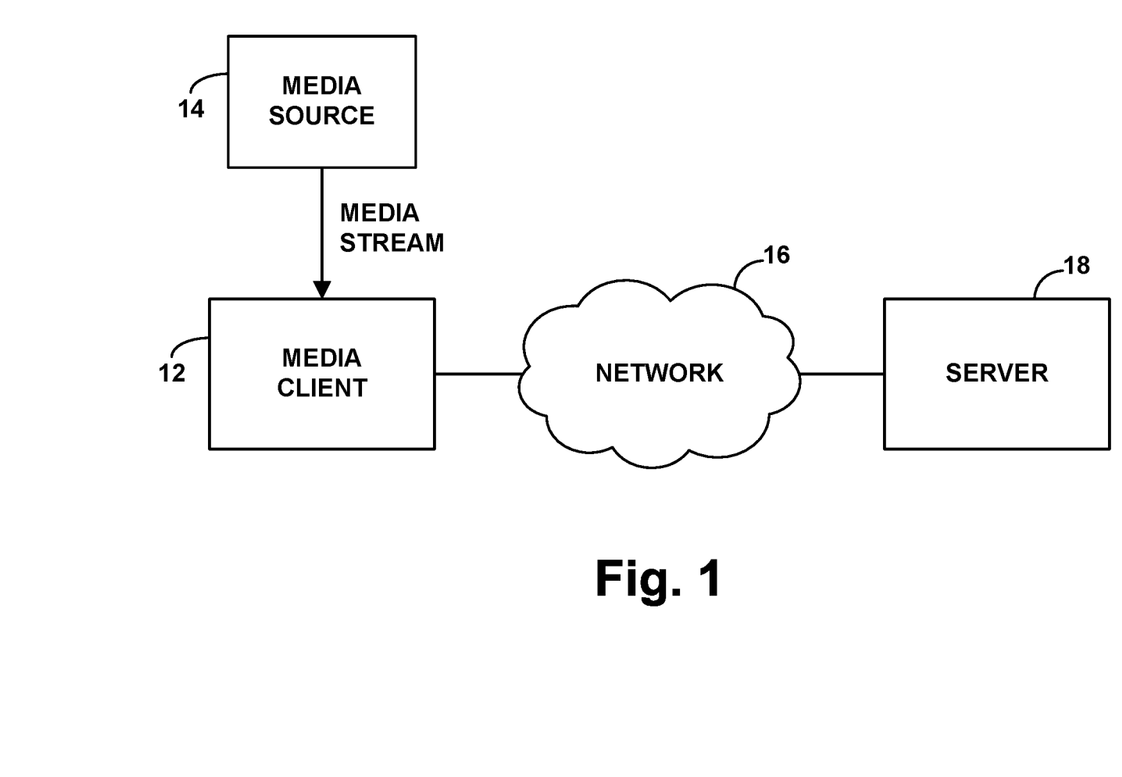
FIG. 1 is a simplified block diagram of system in which disclosed features can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that operations described herein as being carried out by one or more entities could be implemented by and/or on behalf of those entities, through hardware, firmware, and/or software, such as by one or more processing units executing program instructions or the like.

As shown in FIG. 1, the example system includes a media client 12 configured to receive a media stream in real-time from a media source 14.

In practice, the media client 12 could be configured to operate as described above to receive from the media source 14 an analog or digital media stream representing media content such as video and/or audio content and to output the media content and/or forward the stream for presentation of the content on a user interface such as a display screen and/or an audio speaker. The media client could take any of the forms described above, among other possibilities.

The media source 14 could also take various forms, possibly depending on the form of the media client 12. By way of example, if the media client 12 is a television, the media source 14 could be a local set top box (e.g., cable or satellite receiver) or a streaming media server, configured to output a selected media stream for presentation by the television, or the media source 14 could be a broadcast television station or the like, among other possibilities. And if the media client is a computer, the media source may comprise an Internet streaming media server or other media provider. Alternatively, the media source 14 could be data storage integrated with and/or accessible locally by the media client 12, with the media client receiving (e.g., retrieving) the media stream from the data storage for playout. Other examples are possible as well.

As further shown in FIG. 1, media client 12 could be in communication over a network (e.g., the Internet or a private network) 16 with a network server 18, which may or may not be associated with and/or integrated with media source 14.

In an example implementation, media client 12 and network server 18 could engage in data communication to facilitate carrying out operations such as those noted above. For instance, aspects of a representative computing system could be implemented by the server 18, interoperating with the client 12 to establish synchronous lock, to apply the synchronous lock to determine a client-time point when the client should perform a content revision, and to cause the client to perform the content revision at the determined client-time point. Further or alternatively, aspects of a representative computing system could be implemented by the client 12, interoperating with the server 18 to carry out similar operations.

As noted above, when a media client such as client 12 is receiving a media stream, it may be useful for the client to revise a portion of the stream's content, such as to replace or supplement a segment of the stream's content. Further, as noted above, it may be desirable for the client to do so at a specific time point within the media stream. For instance, if the stream defines a sequence of frames, such as video frames and/or audio frames, it may be desirable for the client to perform the revision starting at a specific frame of the sequence.

To facilitate such content revision, as indicated above, a computing system could first identify the media stream that is being received by the client. For instance, the computing system could first determine that the media stream being received by the client is one that contains particular content that should be revised. Upon identifying the media stream, the computing system could then determine a specific point in the media stream where the client should perform the content revision and could cause the client to perform the content revision at that determined point.

One way to identify the media stream being received by client 12 is to have the client (or an adjunct device) generate digital fingerprint data representing the media content being received by the client, and to have server 18 compare that fingerprint data with reference fingerprint data representing media content of a known media stream, with one or more fingerprint matches indicating that the client is receiving the known media stream.

In an example implementation, server 18 or another such entity could establish or otherwise have access to reference fingerprint data representing the known media stream. For instance, server 18 could establish or be provisioned with a sequence of reference digital fingerprints representing frames of the known media stream. The server or another entity could establish these reference fingerprints by programmatically analyzing frames of the known media stream, receiving as input a copy of the known media stream and applying any media fingerprinting process or algorithm now known or later developed to generate the reference fingerprints.

These reference fingerprints could be generated at a relatively high level of granularity to facilitate fingerprint matching. For example, a reference fingerprint could be established respectively for each frame of the known media stream. For a media stream comprising video at 30 frames per second, the sequence could thus include reference video fingerprints generated at a rate of 30 frames per second, or at another reasonably high rate, as high-rate reference fingerprints.

Further, in real time as the client 12 receives a media stream, the client could generate query fingerprint data representing the media content of the stream that it is receiving and could transmit the query fingerprint data to the server 18 for analysis. The client could establish these query fingerprints using the same fingerprinting process or algorithm applied to establish the reference fingerprints, to facilitate fingerprint comparisons. However, as noted above, due to resource limitations at the client (e.g., limitations on processing power, memory, and network speed) or for other reasons, and given that this query-fingerprint generation could be an ongoing process for the client, the client could be configured to generate these query fingerprints at a relatively low rate. For instance, for a media stream comprising video, the client could be configured to generate these query fingerprints at a rate of only 2 frames per second, and the client might transmit generated query fingerprints to the server every 1.5 seconds or so. Other examples are possible as well.

As the server receives this query fingerprint data from the client, the server could compare the query fingerprint data with the reference fingerprint data of the known media stream. And if the server thereby determines with sufficient confidence that the query fingerprint data matches the reference fingerprint data, the server could conclude that the media stream being received by the client is the known media stream (i.e., a copy of the known media stream).

The server could conduct this fingerprint comparison on a per-frame basis. Considering video content, for instance, the server could conduct the analysis on a per-video-frame basis, comparing a query fingerprint of a frame against a reference fingerprint of a frame. The comparison process could take any of a variety of forms, depending on the structure of the fingerprints. For example, the comparison could involve computing a maximum deviation between the fingerprints and determining if the maximum deviation is within a predefined tolerance. Further, if the fingerprints are binary, this could be a Boolean determination or could involve computing a Hamming distance (as a count of mismatches between respective bit locations in the fingerprints). And if the fingerprints are more complex values, such as decimal values or vectors (e.g., grey values per video frame region), this could involve determining a distance between the values or vectors. Numerous other examples are possible as well.

In addition, the server could conduct this fingerprint comparison process with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media.

Through this comparison of the client-generated query fingerprints with the reference fingerprints of the known media stream, the server could thereby find one or more matches. For instance, the server could find one or more instances where a query fingerprint of a frame of the media stream being received by the client matches a respective reference fingerprint of a frame of the known media stream. This matching could thus establish or support a conclusion that the media stream being received by the client is the known media stream.

Having identified the media stream being received by the client, the server could then determine a point in the media stream where the client should perform a content revision. In a representative implementation, for instance, the server could have access to reference data that indicates the point in the known media stream where a content revision is to occur and that indicates what content revision is to occur at that point. For example, the reference data may identify a particular frame of the known media stream where a content revision is to start. Thus, the server could refer to the reference data to determine that desired content-revision point.

The server could then transmit to the client a directive that causes the client to perform the content revision at the determined point in the media stream. For instance, the server could transmit to the client over network 16 a message that specifies the determined point in the media stream and that provides the client with replacement or overlay media or otherwise directs the client as to what content revision the client is to perform at that point in the media stream. And the client could be configured to receive and interpret the directive and to responsively perform the content revision at the indicated point in the media stream.

In this process, the server may know the particular time point where the client should perform the content revision in the media stream. For instance, the reference data accessible by the server could specify this time point as a particular time measured in a timeline within the known media stream, i.e., within "true time" as described above. As noted above, for example, this timeline might start with an origin time (e.g., T=0) at a start of the known media stream, and each frame of the known media stream might occur at a particular time point on that timeline. Thus, the server may determine from reference data the true-time point where the client should perform the content revision in the media stream.

However, the client's time reference may be different. As noted above, the client's time reference may be "client time" defined according to an internal clock in the client. Although client time and true time may optimally run at the same rate as each other, their origin points would likely differ. Therefore, mere knowledge of a true-time point in the known media stream would not itself provide context in client time. As a result, at issue as noted above is how the server could characterize in a client-understandable manner the time point in the media stream where the client is to start performing the content revision.

One way to address this issue as suggested above is to have the server use client-provided timestamps of matching query fingerprints as a way for the server to determine the client's time reference for the media stream, and then have the server use that client time-reference as a basis to characterize the time point in the media stream where the client is to start the content revision.

To facilitate this, as the client generates its query fingerprints, the client could timestamp each query fingerprint based on the client's internal clock. Thus, the query fingerprints that the client transmits to the sever for analysis could be timestamped query fingerprints. Further, the server could be provisioned with or otherwise have access to timestamped reference fingerprints of the known media stream frames. For instance, the server could be provisioned with reference data specifying for each frame of the known media stream (i) a reference fingerprint of the frame and (ii) an associated true-time timestamp within the known media stream.

As the server receives the timestamped query fingerprints from the client, the server could compare the query fingerprints with the reference fingerprints in an effort to detect matching points, i.e., instances where a query fingerprint matches a reference fingerprint. When the server has detected one or more such matching points, the server will know for each detected matching point both (i) the true-time timestamp of the matching point and (ii) the client-time timestamp of the matching point.

As such, the server will have effectively established a synchronous lock between true time and client time. Namely, the server will have effectively established a mapping between (i) true-time timestamps within the media stream and (ii) client time according to the client's internal clock, as the server will now know both where in the media stream the matching frame was and what the client's time was at that time point in the media stream. As discussed above, this synchronous lock may constitute a time offset, such that the server could apply the time offset to a given true-time point in the media stream to determine the corresponding client-time point in the media stream.

Having found this matching point in the media stream and having established the synchronous lock, the server could compute the client-time point when the client is to perform the content revision in the media stream, i.e., where the client is to start the content in the media stream. For example, given the reference-data indication of the true-time point when the content revision is to occur, the server could apply the offset defined by the synchronous lock, to determine the associated client-time point when the content revision is to occur. Or the server could compute a duration within the known media stream from the true-time point of the matching point to the time of the frame where the content revision is to start and the server could then add that computed duration on to the client-time point of the matching point, in order to determine the associated client-time point when the content revision is to start. Other examples could be possible as well.

The server could then transmit a specification of this determined client-time point to the client, with a directive for the client to perform the content revision starting at this client-time point. And if the client is not already provisioned with information about the content revision to perform starting at that time, the server could also transmit that content-revision information to the client. For instance, the server could retrieve from data storage and transmit to the client certain replacement content for the client to substitute in place of content in the media stream being received by the client. Or the server could transmit to the client a pointer to such replacement content, such as a network or local storage address from which the client could obtain the replacement content.

The client could thus receive from the server the directive to start the content revision at the indicated client-time point. And if the client is not already provisioned with data defining the revision to perform at that client-time point, the client could receive that data, such as from the server or from an address specified by the server. By reference to the client's internal clock, the client could then work to accurately start the content revision at the indicated client-time point. For instance, at the indicated client-time point, the client could begin substituting frames of replacement content for frames of the media stream being received by the client, or overlaying supplemental content on frames of the media stream being received by the client, among other possibilities.

As noted above, however, another issue in this process can arise if the client generates its query fingerprints at a relatively low rate, such as video fingerprints at 2 frames per second as discussed above. Providing the server with query fingerprints generated at such a low rate could make it difficult for the server to confidently identify a matching point in the media stream and/or could result in low-confidence synchronous lock. One reason for this difficulty as noted above is that the media stream may include various sub-sequences of identical or nearly identical frames, corresponding with portions of the media sequence where the media content does not change at all over a period of time. As a result, some of the query fingerprints generated at the low rate might match multiple reference fingerprints, giving rise to a low-confidence match and low-confidence synchronous lock at best.

A resolution to this issue could be to have the client generate its query fingerprints at a much higher rate, such as 16 frames per second or perhaps even 30 frames per second. With the client generating its query fingerprints at the higher rate, the server could establish one or more higher-confidence matches between the query fingerprints and the reference fingerprints. For instance, if the server detects that a query fingerprint matches two sequential reference fingerprints, the server could discard those matches on grounds of ambiguity and could wait for a match where a query fingerprint matches just a single reference fingerprint. Or if the server detects the same match between two sequential pairs of query fingerprints and reference fingerprints, the server could discard the matches on grounds of ambiguity and could likewise wait for a more unique match.

Unfortunately, however, as noted above, resource limitations at the client could make it difficult for the client to generate fingerprints at such a high rate on an ongoing basis.

Per the present disclosure, an improved solution is to have the client use a hybrid of these fingerprint-generation rates. The client could normally generate query fingerprints at a low rate (e.g., 2 frames per second), to help conserve resources. And the server could conduct its fingerprint analysis based on those low-rate query fingerprints to determine that the client is receiving the known media stream as discussed above. Once the server thereby determines that the client is receiving the known media stream, and given the server's knowledge that a content revision should be performed at a specific point later in the media stream, the server could then direct the client to increase the client's fingerprint generation rate, to enable the server to conduct a more granular fingerprint comparison. For instance, the server could direct the client to switch from generating query fingerprints at 2 frames per second to generating query fingerprints at 16 frames per second or even 30 frames per second, and to providing those high-rate query fingerprints to the server.

Having identified the media stream being received by the client based on low-rate query fingerprints, the server could then conduct a more granular analysis using the high-rate query fingerprints, in order to detect a matching point on a frame-accurate basis or at least with a much higher level of confidence, and to achieve higher-confidence synchronous lock.

In an example implementation of this process, the fingerprint-rate change directive that the server sends to the client could cause the client to start using the increased fingerprint rate at a subsequent client-time that is threshold far in advance of when the content revision (e.g., a next-occurring content revision) is to start. This could be helpful in a situation where a substantial amount of time will pass from the detected matching point until the time when the content revision is to start, and where the server would probably not need that much time to confidently detect the matching point using the high-rate query fingerprints.

For instance, based on historical data, the server or another entity could determine how much time it typically takes the server to confidently detect a matching point in the known media stream once a representative client (perhaps the client at issue) starts generating query fingerprints at the increased rate. The server then could deem that amount of time, plus a predefined safety duration accounting for low confidence in the analysis, to be a threshold advanced duration for the client to increase its query fingerprint generation rate. Alternatively, the server could otherwise determine or be pre-provisioned with such a threshold advanced duration value.

The server could then configure its rate-change directive to cause the client to switch from low-rate fingerprinting to high-rate fingerprinting at a client-time that is that threshold advanced duration before the content revision is to start. The server could compute this advanced client-time based on the low-confidence synchronous lock described above. Namely, establishing the synchronous lock based on the client's low-rate query fingerprints, the server could estimate a client-time point when the content revision is to occur. And the server could then subtract the threshold advanced duration from that estimated client-time point to compute the advanced client-time point that is the threshold advanced duration before the content revision is to start.

The server could configure its rate-change directive in various ways to cause the client to switch to high-rate fingerprinting at the determined advanced client-time point. For example, the server provide the directive to the client at the advanced client-time point, to cause the client to immediately increase its fingerprint-generation rate. Alternatively, the server could include in its directive to the client a specification of the advanced client-time point, to cause the client to increase its fingerprint-generation rate when that advanced client-time arrives. Further, the client could correspondingly be configured to respond to such a directive by switching to high-rate fingerprint generation as indicated. Other examples could be possible as well.

Once the server has detected a matching point on a frame-accurate basis or otherwise with higher confidence using the client's high-rate query fingerprints, the server could then establish synchronous lock with higher confidence as discussed above. Namely, based on the query-fingerprint timestamp associated with the detected matching point, and based on a computed duration until the time when content revision is to start, the server could compute with higher confidence a client-time point when the content revision is to start. The server could then transmit to the client a directive for the client to start the content revision at the computed client-time point. And the client could thus receive the directive and responsively start the content revision when the indicated client-time point arrives.

As a non-limiting example of this process, consider a media stream that defines an ad pod that could appear within a television broadcast. As noted above, the ad pod would comprise a sequence of ads, such as television commercials, and the ad pod could appear at any given time in a linear media feed, such as a linear broadcast feed, being received by the client.

In practice, the server could be provisioned with time-stamped reference fingerprints representing and corresponding with the frames of the ad pod, with the timestamps being points along a timeline defined within the ad pod (as true-time). Further, the server could be provisioned with an indication that a particular one of the ads in the ad pod should be replaced, and with a timestamp of the frame where that ad replacement should start.

On an ongoing basis, or in response to one or more other triggers, as the client is receiving a media feed, the client could be generating low-rate timestamped query fingerprints of the broadcast feed, such as at 2 frames per second, and could be reporting those timestamped query fingerprints to the server for analysis. Comparing each such query fingerprint with the reference fingerprints representing the frames of the ad pod sequence, the server could thereby detect that the client is receiving the known ad pod sequence.

Having determined that the client is receiving the ad pod sequence, the server could then responsively transmit to the client a directive for the client to switch to high-rate fingerprinting, such as to switch from generating query fingerprints at 2 frames per second to instead generating query fingerprints at 16 or 30 frames per second, perhaps specifying an advanced client-time point when the client should perform this rate switch as discussed above. And the client could responsively perform the rate switch and begin transmitting its high-rate timestamped query fingerprints to the server for analysis.

Using the high-rate query fingerprints in the manner described above, the server could thereby detect one or more matching points in the ad pod sequence, with a high level of confidence. Based on the detected matching points as discussed above, the server could then establish relatively high-confidence synchronous lock, defining a mapping of true-time to client-time. And the server could then apply the established synchronous lock as a basis to translate the true-time point of the frame where the ad replacement is to start into a corresponding client-time point when the client should start the ad replacement.

The server could then transmit to the client a directive to start the ad replacement at that determined client-time point and could transmit to client the replacement ad (or a pointer to the replacement ad) if the client is not already provisioned with that information. And the client could then accordingly perform the ad replacement at the indicated client-time point.

In a representative implementation, after the client performs the indicated content revision, such as an ad replacement, the client could automatically revert to generating low-rate query fingerprints. For instance, if the client had switched from generating query fingerprints at 2 frames per second to generating query fingerprints at 16 or 30 frames per second, the client could then revert generating query fingerprints at 2 frames per second. And the process could repeat as desired.

Certain of the operations described above as being carried out by the server could alternatively be carried out by the client as noted above, or by another device for that matter.

By way of example, although the above discussion described the server working to establish synchronous lock and thereby determining the client-time point when the content revision is to occur, the client could be configured to carry out some of those operations itself.

For instance, once the server has determined that the client is receiving the known media stream, the client could carry out the process to establish synchronous lock between (i) true-time timestamps in the media stream and (ii) time according to the client's internal clock, and to determine the client-time point when the content revision is to occur. To facilitate this in an example implementation, in addition to directing the client to switch to high-rate fingerprinting, the server could provide the client with a set of true-time timestamped reference fingerprints for an upcoming portion of the media stream and could inform the client of the true-time timestamp for the frame within the media stream where the content revision is to start.

The client could thus receive those timestamped reference fingerprints from the server and could further start generating high-rate query fingerprints. And the client could compare its high-rate query fingerprints with the provided reference fingerprints in an effort to find one or more matching points with relatively high confidence. When the client has thereby detected one or more matching points, the client will know both (i) the true-time timestamp of the matching point and (ii) the client-time point of the matching point. As such, the client itself will have effectively established synchronous lock between (i) true-time timestamps within the media stream and (ii) time according to the client's internal clock, as the client will now know both where in the media stream the matching frame was and what the client's time was at that time point in the media stream.

Having found this matching point in the media stream and having established the synchronous lock, the client could then readily compute the client-time point when the content revision is to occur. For instance, given the server-provided indication of the true-time point where the content revision is to start, the client could apply the offset defined by the synchronous lock, to determine the associated client-time point when the content revision is to occur. Or the client could compute a duration within the media stream from the true-time point of the matching point to the indicated true-time point where the content revision is to start, and the client could add that computed duration on to the client-time point of the matching point, in order to determine the associated client-time point when the content revision is to start. The client could then work to accurately start the content revision at the computed client-time point.

In this alternative implementation, the server could provide the client with high-rate reference fingerprints of the upcoming portion of the media stream, to facilitate the client's comparison of its high-rate query fingerprints with those high-rate reference fingerprints. Alternatively, possibly depending on resource constraints, the server could provide the client with low-rate reference fingerprints for the client to compare with the client's high-rate query fingerprints. The client could then determine one or more high-rate query fingerprints that best matches one or more of the low-rate reference fingerprints, to help enhance frame-accuracy of the determined matching point and to increase confidence of the synchronous lock.

Note also that the above processes could apply with respect to real-time analysis of a linear broadcast feed or the like being received by a client (e.g., for present playout and/or storage) and could apply as well with respect to analysis of a media stream being retrieved by the client from data storage or the like (e.g., for present playout or transfer). Other implementations are possible as well.

Figure 2:
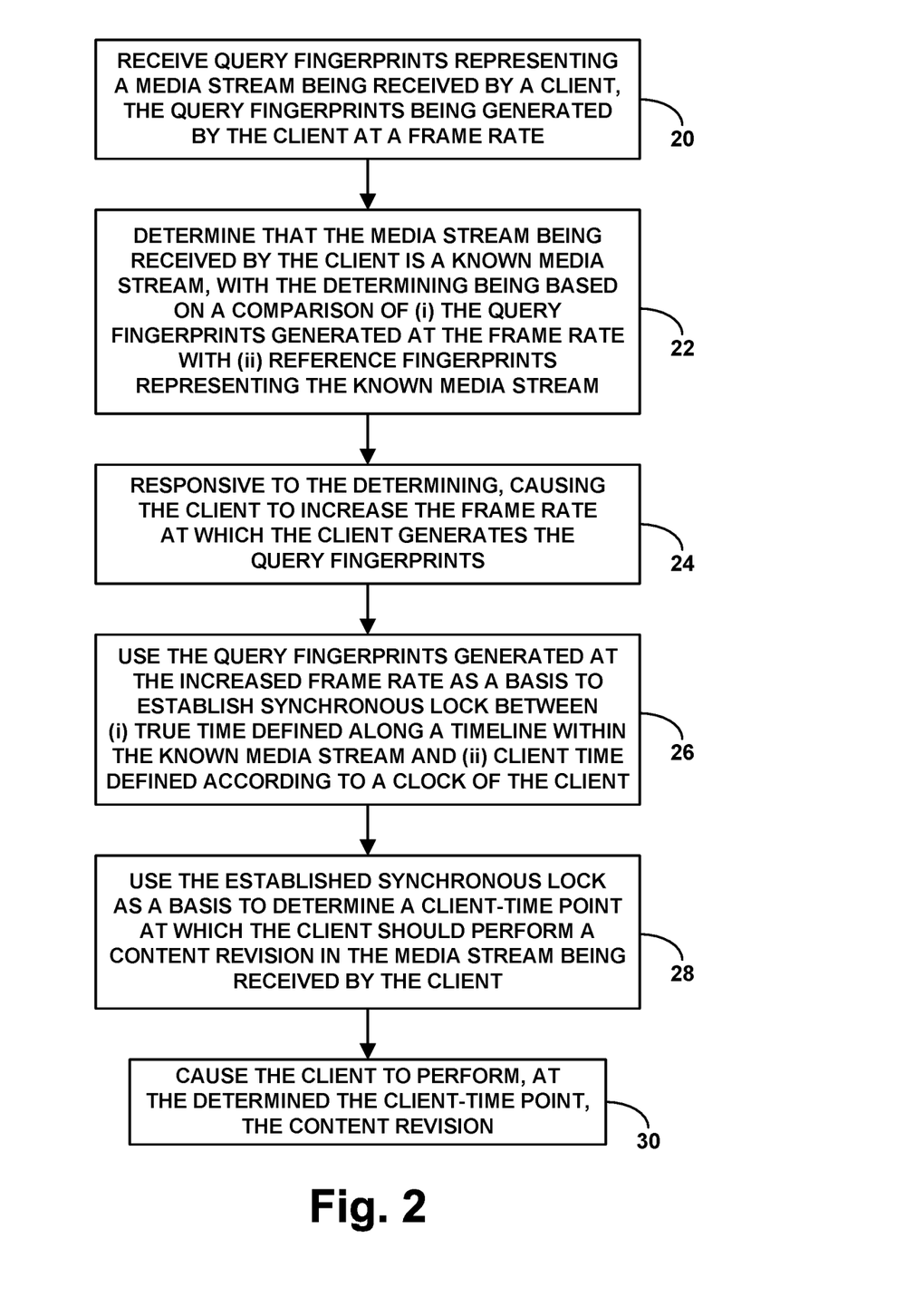
FIG. 2 is a flow chart depicting operations that could be carried out in accordance with the disclosure.

FIG. 2 is a flow chart depicting a method that could be carried out by a computing system in line with the discussion above. Although operations of the method are depicted in this figure as being carried out in a particular sequence, some of the operations could be carried out in parallel with others, and other modifications are possible as well.

As shown in FIG. 2, at block 20, the computing system receives query fingerprints representing a media stream being received by a client, the query fingerprints being generated by the client at a frame rate. At block 22, the computing system determines that the media stream being received by the client is a known media stream, with the determining being based on a comparison by the computing system of (i) the query fingerprints generated at the frame rate with (ii) reference fingerprints representing the known media stream. And at block 24, responsive to the determining, the computing system cause the client to increase the frame rate at which the client generates the query fingerprints being received by the computing system.

At block 26, the computing system then uses the query fingerprints generated at the increased frame rate as a basis to establish synchronous lock between (i) true time defined along a timeline within the known media stream and (ii) client time defined according to a clock of the client. And at block 28, the computing system uses the established synchronous lock as a basis to determine a client-time point at which the client should perform a content revision in the media stream being received by the client. At block 30, the computing system then causes the client to perform, at the determined client-time point, the content revision.

As discussed above, such a computing system could be implemented by a server that is in network communication with the client. In that case, the act of causing the client to increase the frame rate at which the client generates the query fingerprints being received by the computing system could involve transmitting to the client a directive to which the client is configured to respond by increasing the frame rate at which the client generates the query fingerprints being received by the computing system. Further, causing the client to perform the content revision at the determined client-time point could involve transmitting to the client a content-revision directive that indicates the determined client-time point.

As further discussed above, the act of using the query fingerprints generated at the increased frame rate as a basis to establish synchronous lock between true time and client time could involve (a) comparing the query fingerprints generated at the increased frame rate with reference fingerprints of the known media stream, e.g., with further reference fingerprints of the known media stream, (b) based on the comparing of the query fingerprints generated at the increased frame rate with the reference fingerprints of the known media stream, identifying at least one matching point defining a match between a query fingerprint and a reference fingerprint, and (c) establishing the synchronous lock based on a mapping between a client-time timestamp of the query fingerprint and a true-time timestamp of the reference fingerprint.

In addition, as discussed above, the act of using the established synchronous lock as a basis to determine the client-time point at which the client should perform the content revision in the media stream being received by the client could involve using the established synchronous lock as a basis to map a predefined true-time point at which the content revision should be performed in the known media stream to a corresponding client-time point at which the client should perform the content revision in the media stream being received by the client.

Further, as discussed above, the content revision at issue could comprise content replacement. For instance, the media stream being received by the client could comprise an ad pod defining a sequence of ads, and the content revision could involve replacing an ad of the sequence with replacement media content. In addition, as noted above, the method could also comprise provisioning the client with replacement content that the client is to substitute into the media stream being received by the client.

Figure 3:
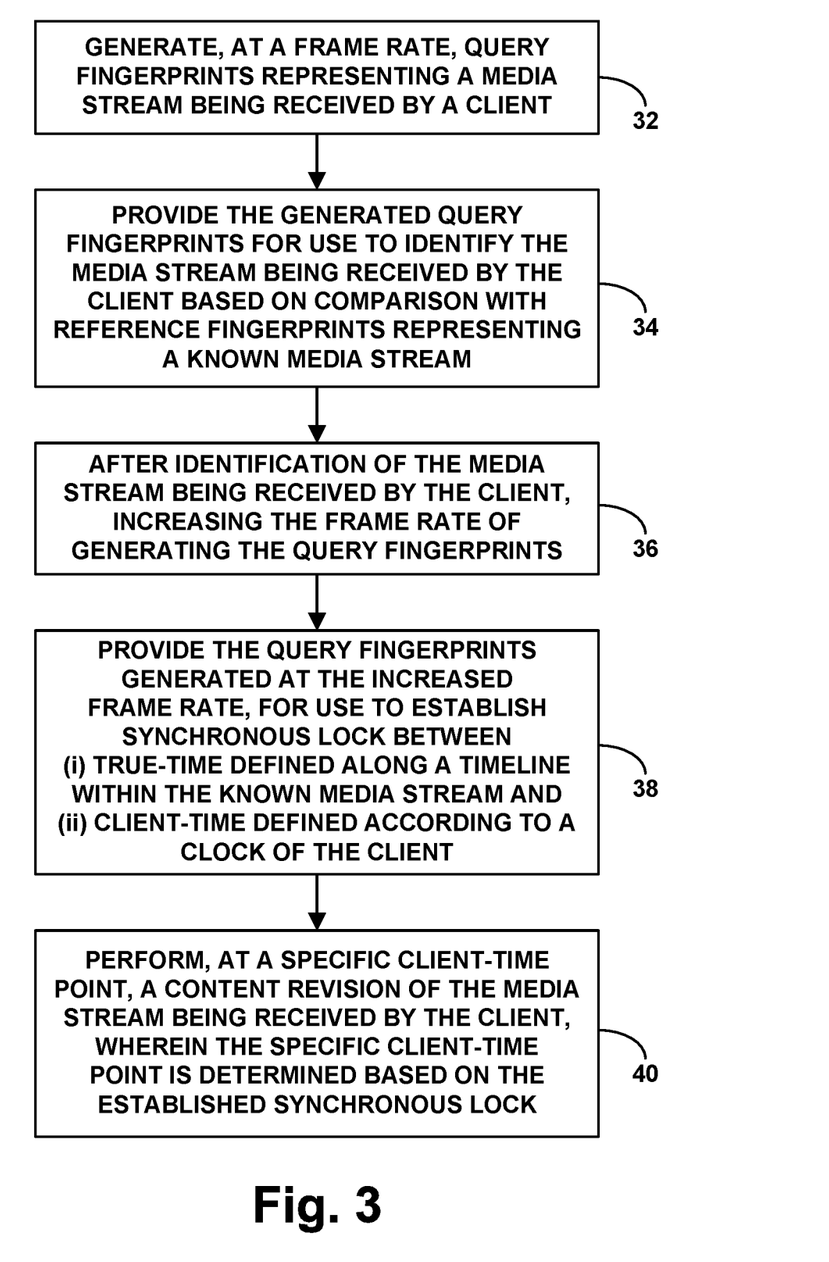
FIG. 3 is another flow chart depicting operations that could be carried out in accordance with the disclosure.

FIG. 3 is another flow chart depicting a method that could be carried out in accordance with the present disclosure, by the client or one or more other entities. Here again, although operations of the method are depicted as being carried out in a particular sequence, some of the operations could be carried out in parallel with others, and other modifications are possible as well.

As shown in FIG. 3, at block 32, the method includes generating query fingerprints representing a media stream being received by a client, the query fingerprints being generated at a frame rate. At block 34, the method includes providing the generated query fingerprints for use to identify the media stream being received by the client based on comparison with reference fingerprints representing a known media stream. And at block 36, the method includes, after identification of the media stream being received by the client, increasing the frame rate of generating the query fingerprints.

At block 38, the method then includes providing the query fingerprints generated at the increased frame rate, for use to establish synchronous lock between (i) true-time defined along a timeline within the known media stream and (ii) client-time defined according to a clock of the client. And t block 40, the method includes performing, at a specific client-time point, a content revision of the media stream being received by the client, wherein the specific client-time point is determined based on the established synchronous lock.

In line with the discussion above, the act of providing the generated query fingerprints for use to identify the media stream being received by the client based on comparison with reference fingerprints representing the known media stream could involve transmitting the generated query fingerprints to a server for use by the server to identify the media stream being received by the client based on comparison with reference fingerprints representing the known media stream. In turn, the act of increasing the frame rate of generating the query fingerprints after identification of the media stream being received by the client could involve, after the server has identified the media stream being received by the client, receiving from the server a directive to increase the frame rate of generating the query fingerprints, and responsively (in response to the directive) increasing the frame rate of generating the query fingerprints.

Further, as discussed above, the act of providing the query fingerprints generated at the increased frame rate, for use to establish synchronous lock between true-time and client-time, could involve transmitting to a server the query fingerprints generated at the increased frame rate, for use by the server to establish the synchronous lock. And the act of performing, at the specific client-time point determined based on the established synchronous lock, the content revision of the media stream being received by the client could involve (a) receiving by the client from the server a content-revision directive directing the client to revise the media stream at the particular client-time point determined based on the established synchronous lock and (b) carrying out by the client the revision of the media stream at the particular client-time point.

In addition, the act of providing the query fingerprints generated at the increased frame rate, for use to establish synchronous lock between true-time and client-time, could involve comprises providing the query fingerprints to a program module at the client for use by the program module at the client to establish the synchronous lock. For instance, the client could be provisioned with program logic including a program module that will operate to establish the synchronous lock based on the query fingerprints generated at the increased frame rate, so those query fingerprints could be provided to that module to facilitate establishment of the synchronous lock.

Further, as discussed above, the method could additionally include using the query fingerprints generated at the increased frame rate as a basis to establish the synchronous lock between true-time and client-time. For instance, the method could include (i) comparing the query fingerprints generated at the increased frame rate with reference fingerprints of the known media stream, (ii) based on the comparing of the query fingerprints generated at the increased frame rate with the reference fingerprints of the known media stream, identifying at least one matching point defining a match between a query fingerprint and a reference fingerprint, and (iii) establishing the synchronous lock based on a mapping between a client-time timestamp of the query fingerprint and a true-time timestamp of the reference fingerprint.

In an example implementation as additionally discussed above, this establishment of the synchronous lock could be carried out by the client. And to facilitate doing so, the method could additionally include receiving by the client the reference fingerprints of the known media stream, so that the client can perform the comparison of the query fingerprints generated at the increased rate with the reference fingerprints of the known media stream.

Figure 4:
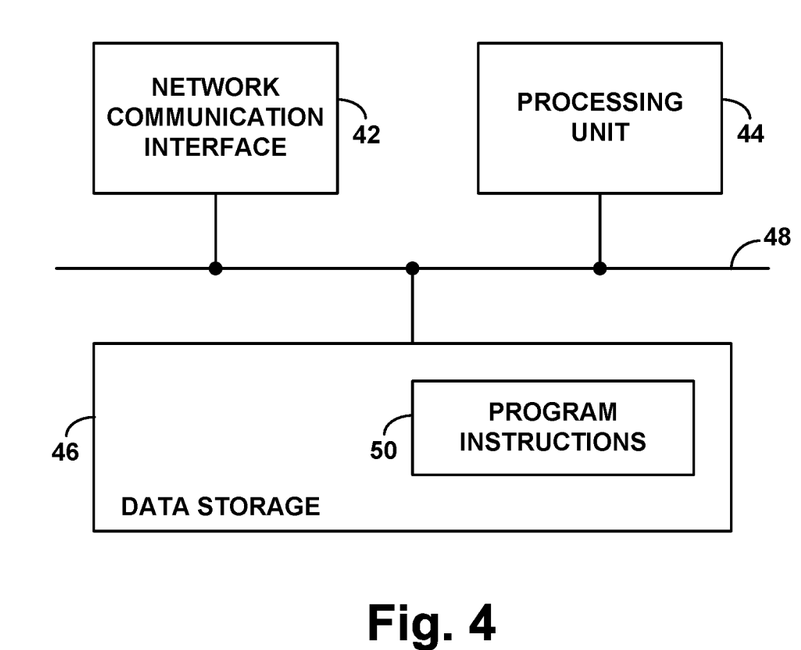
FIG. 4 is a simplified block diagram depicting components of a computing system operable in accordance with the disclosure.

FIG. 4 is next a block diagram of an example computing system operable to carry out various operations described above. As noted above, aspects of such a computing system could be implemented by media client 12 and/or server 18, among other possibilities. Therefore, the block diagram of FIG. 4 could represent components of one or more such entities.

As shown in FIG. 4, the example computing system includes a network communication interface 42, a processing unit 44, and non-transitory data storage 46, all of which could be coupled or communicatively linked together through a network, message bus, and/or one or more other connection mechanisms 48.

Network communication interface 42 enables the computing system to transmit and receive. The network communication interface 42 could comprise wired and/or wireless Ethernet interface along with associated circuitry and software, among other possibilities. The processing unit 44 could then comprise one or more general purpose processors (e.g., microprocessors) and/or one or more specialized processors (e.g., application-specific integrated circuits or the like). And the non-transitory data storage 46 could comprise one or more volatile and/or non-volatile storage components, such as magnetic, optical, or flash storage.

As shown in FIG. 4, the non-transitory data storage 46 stores (e.g., holds, is encoded with, or otherwise embodies or contains) program instructions 50 that are executable by the processing unit to cause the computing system to carry out operations such as those described above.

By way of example, these operations could include identifying a media stream being received by a media client, with the identifying including (i) receiving query fingerprints of the media stream, the query fingerprints being generated by the media client at a frame rate, and (ii) matching the received query fingerprints with reference fingerprints of a known media stream. Here, if the computing system is implemented at least in part by the media client, the act of receiving the query fingerprints could involve receiving into a program module of the media client the query fingerprints generated by a fingerprint-generator module of the media client (e.g., a program module of the media client that will perform query-fingerprint generation). And if the computing system is implemented at least in in part by a server, the act the act of receiving the query fingerprints could involve receiving the query fingerprints transmitted to the server from the media client.

Further, the operations could include, responsive to identifying the media stream, directing the media client to increase the frame rate of generating the query fingerprints. For instance, if the computing system is implemented at least in part by the media client, this could involve directing a fingerprint-generator module of the media client to increase the frame rate. And if the computing system is implemented at least in in part by a server, this could involve transmitting to the media client a directive that causes the media client to increase the frame rate of generating the query fingerprints.

In addition, the operations could include establishing, based on the query fingerprints generated by the media client at the increased frame rate, synchronous lock between true time defined along a timeline within the known media stream and client time defined according to a clock of the media client. For instance, this could include (i) receiving the query fingerprints generated by the media client at the increased frame rate (similarly carried out by the media client and/or by a server), (ii) detecting at least one match between the query fingerprints generated by the media client at the increased frame rate and reference fingerprints of the known media stream, and (iii) correlating a true-time timestamp of the at least one match with a client-time timestamp of the at least one match.

And the operations could include using the established synchronous lock as a basis to determine a client-time point at which the media client should perform a content revision in the media stream being received by the media client. For instance, this could include using the established synchronous lock as a basis to map a predefined true-time point at which the content revision should be performed in the known media stream to a corresponding client-time point at which the media client should perform the content revision in the media stream being received by the media client.

The operations could then include causing the media client to perform, at the determined client-time point, the content revision. For instance, if the computing system is implemented at least in part by the media client, this could involve directing a content-revision module of the media client (e.g., a program module of the media client that will perform content revision) to perform the content revision at the determined client-time point. And if the computing system is implemented at least in in part by a server, this could involve transmitting to the media client a directive that causes the media client to perform the content revision at the determined client-time point.

Alternatively or additionally, the operations could include generating query fingerprints representing a media stream being received by a client, wherein the query fingerprints are generated at a frame rate. Further, the operations could include providing the generated query fingerprints for use to identify the media stream being received by the client based on comparison with reference fingerprints representing a known media stream. And the operations could include, after identification of the media stream being received by the client, increasing the frame rate of generating the query fingerprints. The operations could then include providing the query fingerprints generated at the increased frame rate, for use to establish synchronous lock between (i) true-time defined along a timeline within the known media stream and (ii) client-time defined according to a clock of the client. And the operations could include performing, at a specific client-time point, a content revision of the media stream being received by the client, wherein the specific client-time point is determined based on the established synchronous lock.

Various features described above could be implemented in the context of this computing system, and vice versa. For instance, here too, the content revision could comprise content replacement, such as replacement of an ad in an ad pod, among other possibilities. Further, the act of providing the generated query fingerprints for use to identify the media stream could involve transmitting the generated query fingerprints to a server for use by the server to identify the media stream, and the act of providing the query fingerprints generated at the increased frame rate, for use to establish synchronous lock between true-time and client-time, could involve transmitting to a server the query fingerprints generated at the increased frame rate, for use by the server to establish the synchronous lock.

Further, various operations described above could be defined by program instructions stored on a non-transitory computer readable medium, the program instructions being executable by a processing unit to carry out the operations. Such a non-transitory computer readable medium could then be provided, integrated, or otherwise implemented at the client, server, and/or another entity. Further, such operations could take other forms.

By way of example, the operations could include identifying a media stream being received by a client, with the identifying including (i) receiving query fingerprints of the media stream, the received query fingerprints being generated by the client at a frame rate and (ii) matching the query fingerprints with reference fingerprints of a known media stream. Further, the operations could include, responsive to identifying the media stream, causing the client to increase the frame rate of generating the query fingerprints. And the operations could include establishing, based on the query fingerprints generated by the client at the increased frame rate, synchronous lock between true time defined along a timeline within the known media stream and client time defined according to a clock of the client.

The operations could then include using the established synchronous lock as a basis to determine a client-time point at which the client should perform a content revision in the media stream being received by the client. And the operations could include causing the client to perform, at the determined client-time point, the content revision.

Alternatively or additionally, the operations executable by the processing unit could include generating query fingerprints representing a media stream being received by a client, wherein the query fingerprints are generated at a frame rate. Further, the operations could include providing the generated query fingerprints for use to identify the media stream being received by the client based on comparison with reference fingerprints representing a known media stream. And the operations could include, after identification of the media stream being received by the client, increasing the frame rate of generating the query fingerprints. The operations could then include providing the query fingerprints generated at the increased frame rate, for use to establish synchronous lock between true-time and client-time. And the operations could include performing, at a specific client-time point, a content revision of the media stream being received by the client, wherein the specific client-time point is determined based on the established synchronous lock.

Various features described above can be implemented in this context as well, and vice versa.

For example, in an implementation at the server, the act of causing the client to increase the frame rate of generating the query fingerprints could involve outputting for transmission to the client a directive to which the client is configured to respond by increasing the frame rate at which the client generates the query fingerprints, and the act of causing the client to perform the content revision at the determined client-time point could involve outputting for transmission to the client a content-revision directive indicating the determined client-time point.

Whereas, in an implementation at the client, the act of causing the client to increase the frame rate of generating the query fingerprints could involve directing a fingerprint-generator module of the client to increase the frame rate, and the act of causing the client to perform the content revision at the determined client-time point could involve directing a content-revision module of the client to perform the content revision at the determined client-time point.

Further, here too, the media stream being received by the client could comprise an ad pod defining a sequence of ads, and the content revision could comprise replacing an ad of the sequence with replacement media content.

Exemplary embodiments have been described above. Those skilled in the art will understand, however, that changes and modifications may be made to these embodiments without departing from the true scope and spirit of the invention.

What is claimed is:

1. A method comprising:

receiving, by a computing system, query fingerprints representing a media stream being received by a client, wherein the query fingerprints are generated by the client at a frame rate;

determining by a computing system that the media stream being received by the client is a known media stream, wherein the determining is based on a comparison by the computing system of (i) the query fingerprints generated at the frame rate with (ii) reference fingerprints representing the known media stream;

responsive to the determining, causing by the computing system the client to increase the frame rate at which the client generates the query fingerprints being received by the computing system;

using by the computing system the query fingerprints generated at the increased frame rate as a basis to establish synchronous lock between (i) true time defined along a timeline within the known media stream and (ii) client time defined according to a clock of the client;

using by the computing system the established synchronous lock as a basis to determine a client-time point at which the client should perform ad replacement in the media stream being received by the client; and causing the client to perform, at the determined client-time point, the ad replacement.

2. The method of claim 1, wherein the media stream being received by the client has a frame rate, and wherein the frame rate at which the client generates the query fingerprints is different than the frame rate of the media stream.

3. The method of claim 1, wherein performing the ad replacement at the determined client-time point comprises starting the ad replacement at the determined client-time point.

4. The method of claim 1, wherein the computing system is implemented by a server in network communication with the client.

5. The method of claim 4, wherein causing the client to increase the frame rate at which the client generates the query fingerprints being received by the computing system comprises transmitting to the client a directive to which the client is configured to respond by increasing the frame rate at which the client generates the query fingerprints being received by the computing system.

6. The method of claim 4, wherein causing the client to perform the ad replacement at the determined client-time point comprises transmitting to the client a content-revision directive indicating the determined client-time point.

7. The method of claim 1, wherein using the query fingerprints generated at the increased frame rate as a basis to establish synchronous lock between (i) true time defined along a timeline within the known media stream and (ii) client time defined according to a clock of the client comprises:

comparing the query fingerprints generated at the increased frame rate with reference fingerprints of the known media stream;

based on the comparing of the query fingerprints generated at the increased frame rate with the reference fingerprints of the known media stream, identifying at least one matching point defining a match between a query fingerprint and a reference fingerprint; and establishing the synchronous lock based on a mapping between a client-time timestamp of the query fingerprint and a true-time timestamp of the reference fingerprint.

8. The method of claim 1, wherein using the established synchronous lock as a basis to determine the client-time point at which the client should perform the ad replacement in the media stream being received by the client comprises using the established synchronous lock as a basis to map a predefined true-time point at which the ad replacement should be performed in the known media stream to a corresponding client-time point at which the client should perform the ad replacement in the media stream being received by the client.

9. The method of claim 1, further comprising provisioning the client with a replacement ad that the client is to substitute for an existing ad in the media stream being received by the client.

10. A computing system comprising:

a network communication interface through which to transmit and receive;

a processing unit;

non-transitory data storage; and program instructions stored in the non-transitory data storage and executable by the processing unit to cause the computing system to carry out operations including:

identifying a media stream being received by a media client, wherein the identifying includes (i) receiving query fingerprints of the media stream, the received query fingerprints being generated by the media client at a frame rate, and (ii) matching the received query fingerprints with reference fingerprints of a known media stream, responsive to identifying the media stream, transmitting to the media client a directive that causes the media client to increase the frame rate of generating the query fingerprints, establishing, based on the query fingerprints generated by the media client at the increased frame rate, synchronous lock between true time defined along a timeline within the known media stream and client time defined according to a clock of the media client, using the established synchronous lock as a basis to determine a client-time point at which the media client should perform ad replacement in the media stream being received by the media client, and transmitting to the media client a directive that causes the media client to perform, at the determined client-time point, the ad replacement.

11. The computing system of claim 10, wherein the media stream being received by the client has a frame rate, and wherein the frame rate at which the client generates the query fingerprints is different than the frame rate of the media stream.

12. The computing system of claim 10, wherein performing the ad replacement at the client-time point comprises starting the ad replacement at the client-time point.

13. The computing system of 10, wherein establishing the synchronous lock includes (i) receiving the query fingerprints generated by the media client at the increased frame rate, (ii) detecting at least one match between the query fingerprints generated by the media client at the increased frame rate and reference fingerprints of the known media stream, and (iii) correlating a true-time timestamp of the at least one match with a client-time timestamp of the at least one match.

14. The computing system of claim 10, wherein using the established synchronous lock as a basis to determine the client-time point at which the media client should perform the ad replacement in the media stream being received by the media client comprises using the established synchronous lock as a basis to map a predefined true-time point at which the ad replacement should be performed in the known media stream to a corresponding client-time point at which the media client should perform the ad replacement in the media stream being received by the media client.

15. A non-transitory computer readable medium storing instructions executable by a processing unit to carry out operations comprising:
    identifying a media stream being received by a client, wherein the identifying includes (i) receiving query fingerprints of the media stream, the received query fingerprints being generated by the client at a frame rate and (ii) matching the query fingerprints with reference fingerprints of a known media stream;
    responsive to identifying the media stream, causing the client to increase the frame rate of generating the query fingerprints;
    establishing, based on the query fingerprints generated by the client at the increased frame rate, synchronous lock between true time defined along a timeline within the known media stream and client time defined according to a clock of the client;
    using the established synchronous lock as a basis to determine a client-time point at which the client should perform ad replacement in the media stream being received by the client; and
    causing the client to start, at the determined client-time point, the ad replacement.

16. The non-transitory computer readable medium of claim 14, wherein the media stream being received by the client has a frame rate, and wherein the frame rate at which the client generates the query fingerprints is different than the frame rate of the media stream.

17. The non-transitory computer readable medium of claim 15, wherein causing the client to increase the frame rate of generating the query fingerprints comprises outputting for transmission to the client a directive to which the client is configured to respond by increasing the frame rate at which the client generates the query fingerprints.

18. The non-transitory computer readable medium of claim 15, wherein causing the client to perform the ad replacement at the determined client-time point comprises outputting for transmission to the client a content-revision directive indicating the determined client-time point.

19. The non-transitory computer readable medium of claim 15, wherein establishing the synchronous lock comprises:
    comparing the query fingerprints generated by the client at the increased frame rate with reference fingerprints of the known media stream;
    based on the comparing of the query fingerprints generated at the increased frame rate with reference fingerprints of the known media stream, identifying at least one matching point defining a match between a query fingerprint and a reference fingerprint; and
    establishing the synchronous lock based on a mapping between a client-time timestamp of the query fingerprint and a true-time timestamp of the reference fingerprint.

20. The non-transitory computer readable medium of claim 15, wherein using the established synchronous lock as a basis to determine the client-time point at which the client should start the ad replacement in the media stream being received by the client comprises using the established synchronous lock as a basis to map a predefined true-time point at which the ad replacement should be started in the known media stream to a corresponding client-time point at which the client should start the ad replacement in the media stream being received by the client.

* * * * *